May 11, 1954 — G. MEDICUS — 2,678,423

ELECTROSTATIC INSTRUMENT WITH INSULATED MOVING SYSTEMS

Filed Aug. 18, 1950

INVENTOR.
GUSTAV MEDICUS

May 11, 1954  G. MEDICUS  2,678,423
ELECTROSTATIC INSTRUMENT WITH INSULATED MOVING SYSTEMS
Filed Aug. 18, 1950  3 Sheets-Sheet 2

INVENTOR.
GUSTAV MEDICUS
BY Wade Koonty
ATTORNEY
James S. Shannon
AGENT

May 11, 1954  G. MEDICUS  2,678,423
ELECTROSTATIC INSTRUMENT WITH INSULATED MOVING SYSTEMS
Filed Aug. 18, 1950  3 Sheets-Sheet 3
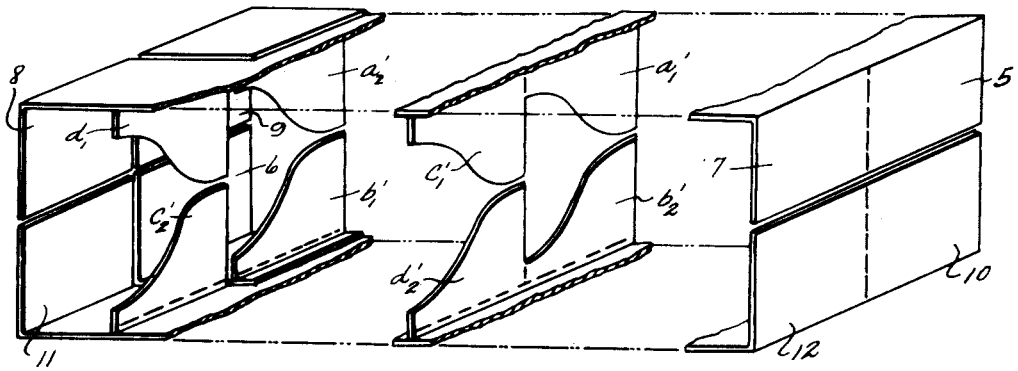
Fig 2a
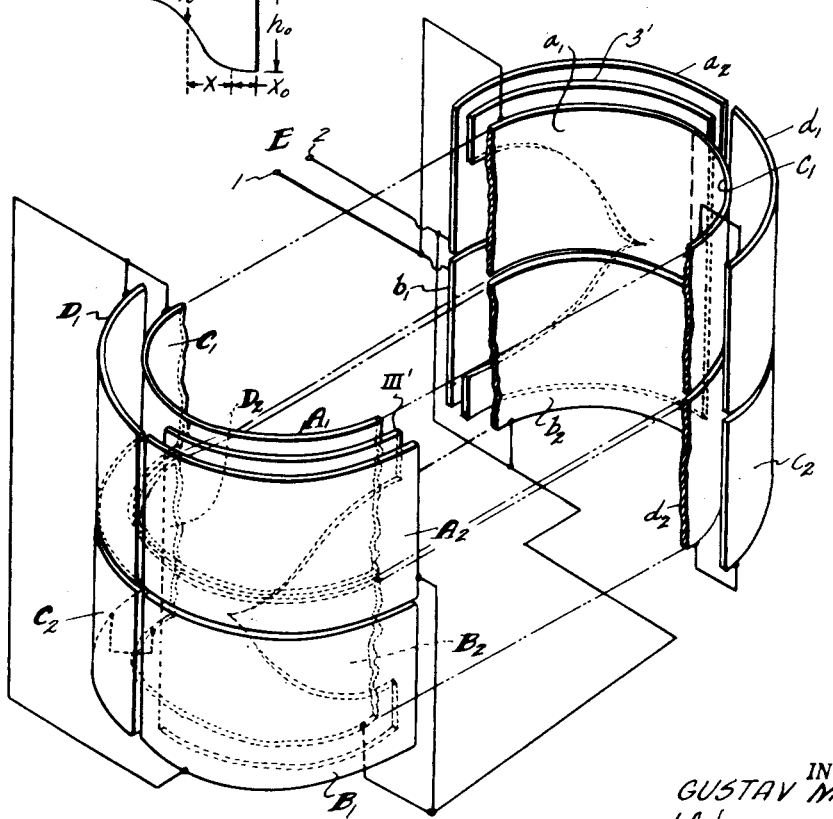
Fig 2b
Fig 3c
INVENTOR.
GUSTAV MEDICUS
BY Wade Koontz
ATTORNEY
James J. Shannon
AGENT Patented May 11, 1954

2,678,423

UNITED STATES PATENT OFFICE 2,678,423

ELECTROSTATIC INSTRUMENT WITH INSULATED MOVING SYSTEMS

Gustav Medicus, Munich-Obermenzing, Germany

Application August 18, 1950, Serial No. 180,294

14 Claims. (Cl. 324—109)

(Granted under Title 35, U. S. Code (1952), sec. 266)

The invention described herein may be manufactured and used by or for the Government for governmental purposes without payment to me of any royalty thereon.

This invention relates to electrical instruments of the electrostatic type and has as its object to increase the accuracy of such instruments.

Electrometers of the type having two stationary electrodes and an insulated moving element which have been suggested so far, for instance by Bestelmeyer in Zeitschrift für Techn. Physik, 15, 661, 1934, have the disadvantage that their indication depends upon the potential and therefore on the electrical charge of the moving element. This means an uncontrollable source of error since the indication of the meter can be falsified by both the accumulation of charges on the moving element and by differences in contact potentials that occur when the moving and stationary electrodes are made of different metals.

According to this invention this source of error is eliminated and other advantages are obtained by making the partial capacities of each of the two stationary electrodes to the insulated moving element constant, or, in other words, independent of the angle of deflection of the instrument.

The invention will be more fully described in connection with the specific embodiments thereof shown in the accompanying drawings in which:

Figs. 2a and 2b show a modification of Fig. 2;

Figs. 3a, 3b and 3c show a practical embodiment of the invention using cylindrical electrodes;

Figure 5:
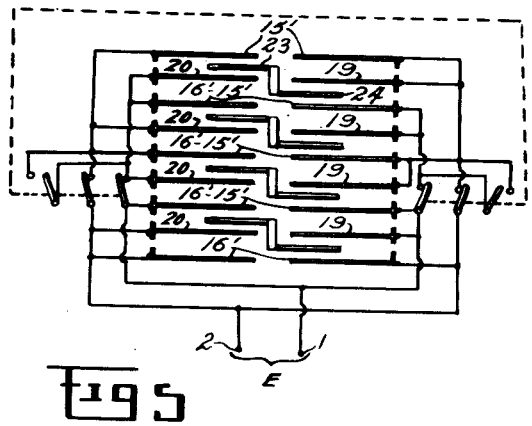
Figure 6:
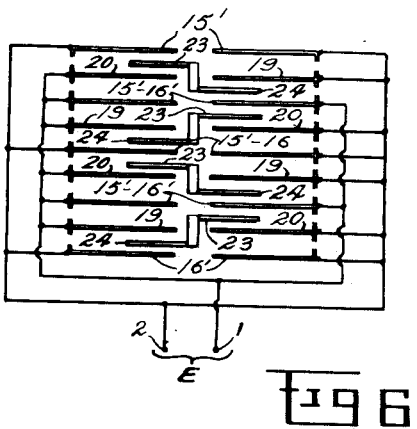

Figs. 5 and 6 show methods of paralleling electrode structures of the type shown in Figs. 4a, 4b, and 4c, and Figs. 7a, 7b and 7c show an embodiment of the invention using plane electrodes in which the deflection is limited to 90°.

Figure 1:
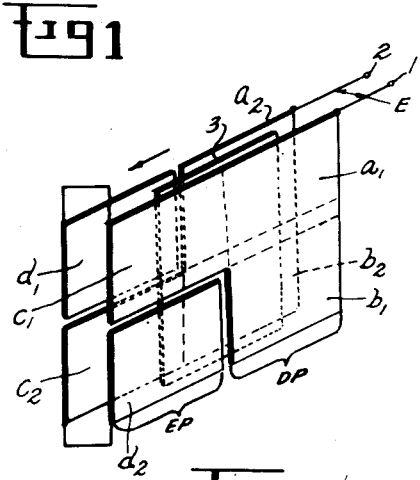
Fig. 1 shows an electrode structure in accordance with the invention.

Fig. 1 shows in schematic form the electrode structure of an electrostatic instrument in accordance with the invention. There are two stationary electrodes connected to the terminals 1 and 2 between which the voltage to be measured, E, is applied. Each stationary electrode will be identified by the terminal to which it is connected. Hence, stationary electrode 1 is the stationary electrode connected to terminal 1 and stationary electrode 2 is the stationary electrode connected to terminal 2. The stationary electrodes are made of metallic plates and, as may be seen in Fig. 1, are each composed of four congruent rectangles. The rectangles forming electrode 1 are designated $a_1$, $b_1$, $c_1$ and $d_1$ and those forming electrode 2 are designated $a_2$, $b_2$, $c_2$ and $d_2$. The rectangles $a_1$, $b_1$ and $c_1$ and also the rectangles $a_2$, $b_2$ and $c_2$ are preferably formed of a continuous piece of metal as shown, the internal boundaries of rectangles $a_1$—$b_1$—$c_1$ and $a_2$—$b_2$—$c_2$ being indicated in the figure by broken lines. The rectangles $a_1$—$b_1$—$c_1$—$d_2$ and $a_2$—$b_2$—$c_2$—$d_1$ are positioned in parallel closely spaced planes, however, the rectangles $d_1$ and $d_2$ are insulated from neighboring rectangles $a_2$—$b_2$—$c_2$ and $a_1$—$b_1$—$c_1$, respectively, but are electrically connected to oppositely disposed rectangles $c_1$ and $c_2$, respectively. With this arrangement it is noted that all oppositely disposed points on the stationary electrodes situated to the right of center differ in potential by the voltage E and accordingly this one-half of the structure is designated the different-potential or DP-half. In that part of the stationary electrode structure to the left of center oppositely disposed points are at the same potential, with any point above the horizontal center line differing in potential from any point below by the voltage E, and accordingly this one-half of the stationary electrode structure is designated the equipotential or EP-half. The moving electrode 3 is made of an insulated metallic plate corresponding in size to two of the above mentioned rectangles, for example $a_1$—$b_1$, and free to move in the direction of the arrow in a plane midway between the two planes containing the stationary electrodes. In a practical embodiment of the invention the movable element 3 would actuate a pointer or other suitable indicating device.

With respect to the electrode structure of Fig. 1 the idea of the invention may be precisely expressed as follows:

(1) $\quad C'_{13}=C'_{23}=0$
(2) $\quad C'_{12}\neq 0$
(3) $\quad C'_{11}=C'_{22}=C'_{33}=0$ in which $C_{12}$, $C_{13}$ and $C_{14}$ represent the partial capacities of the three electrodes to each other; $C_{11}$, $C_{22}$ and $C_{33}$ represent the partial capacities of the three electrodes to ground; and (') represents the first derivative with respect to $d$ of the function $C(d)$, where $d$ is the deflection of electrodes 3 in the direction of the arrow and C is any of the above partial capacities.

To satisfy Equation 1 it is necessary that both the partial capacity between stationary electrode 1 and movable electrode 3, namely $C_{13}$, and the partial capacity between stationary electrode 2 and movable electrode 3, namely $C_{23}$, remain constant during deflection of electrode 3. Considering electrode 3 to be situated wholly on the DP side directly between rectangles $a_1$—$b_1$ and $a_2$—$b_2$, the position of minimum deflection, the capacity $C_{13}$ for this condition equals the capacity between rectangles $a_1$—$b_1$ and electrode 3. As the movable electrode is deflected to the left its capacity to rectangles $a_1$—$b_1$ decreases, however, this decrease is compensated by an equal increase in the capacity between rectangles $d_1$—$c_1$ and electrode 3 so that the total capacity between stationary electrode 1 and electrode 3 remains constant. When the electrode 3 reaches a position wholly on the EP side directly between rectangles $c_1$—$d_2$ and $d_1$—$c_2$, the position of maximum deflection, the capacity $C_{13}$ becomes equal to the sum of the capacities between rectangles $d_1$—$c_1$ and the electrode 3. It will be apparent that this capacity is equal to the capacity between rectangles $a_1$—$b_1$ and electrode 3 that existed in the initial or minimum deflection position of electrode 3. For similar reasons the capacity $C_{23}$, between stationary electrode 2 and movable electrode 3, is constant over the full range of deflection of electrode 3.

To satisfy Equation 2 it is necessary that the capacity between the two stationary electrodes, $C_{12}$, change as the electrode 3 moves between its positions of minimum and maximum deflection. This condition is met by the electrode structure of Fig. 1. Considering electrode 3 to be in its position of minimum deflection, i. e. directly between rectangles $a_1$—$b_1$ and $a_2$—$b_2$, the capacity $C_{12}$ is equal to the capacity between rectangles $a_1$—$b_1$ and electrode 3 and the capacity between rectangles $a_2$—$b_2$ and electrode 3 connected in series. When the movable electrode is in its position of maximum deflection, i. e. directly between rectangles $c_1$—$d_2$ and $d_1$—$c_2$, the capacity $C_{12}$ is equal to the capacity between rectangles $c_1$—$d_1$ and electrode 3 and the capacity between rectangles $c_2$—$d_2$ and electrode 3 connected in series, plus the capacity between rectangles $a_1$—$b_1$ and $a_2$—$b_2$. Since the series combination of the capacities between rectangles $c_1$—$d_1$ and $c_2$—$d_2$ and electrode 3 in its position of maximum deflection equals the series combination of capacities between rectangles $a_1$—$b_1$ and $a_2$—$b_2$ and electrode 3 in its position of minimum deflection, and since the capacity between rectangles $a_1$—$b_1$ and $a_2$—$b_2$ when electrode 3 is in its position of maximum deflection is substantially equal to or only slightly less than the series combination of the capacities between rectangles $a_1$—$b_1$ and $a_2$—$b_2$ and electrode 3 when in its position of minimum deflection, it is seen that the capacity $C_{12}$ is substantially doubles in value as the electrode 3 moves from right to left.

The capacity would exactly double in value if electrode 3 were of infinitesimal thickness and if the border distortions were nonexistent. This condition is approched if the thickness of electrode 3 is small compared to the spacing of the stationary electrodes and if the distances between the electrode faces are small in comparison to the size of the rectangles composing the stationary electrodes. The application of a voltage E between terminals 1—2 will therefore produce a deflection of electrode 3 in the direction of increasing capacity or toward the left in Fig. 1.

The condition of Equation 3 may be fulfilled by adequately shielding the movable electrode 3 from ground. Means for accomplishing this will be shown later.

Figure 2:
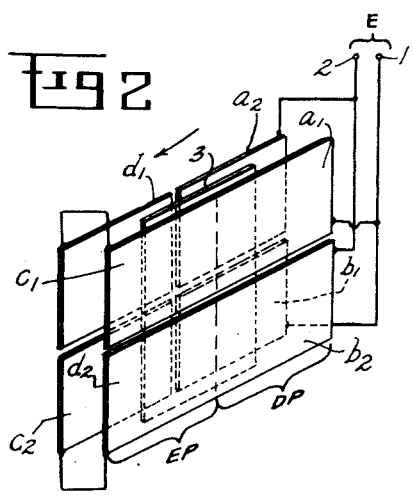
Fig. 2 shows an alternate form of the electrode structure.

Another electrode structure capable of fulfilling the requirements of Equations 1 and 2 is shown in Fig. 2. As in the case of Fig. 1 the two stationary electrodes are distinguished by the terminal to which they are connected.

Thus, as in Fig. 1, rectangles $a_1$, $b_1$, $c_1$ and $d_1$ are all connected together and to terminal 1 and constitute stationary electrode 1, and rectangles $a_2$, $b_2$, $c_2$ and $d_2$ are all connected together and to terminal 2 and constitute stationary electrode 2. A comparison of the two electrode structures shows that the structure of Fig. 2 is derived from that of Fig. 1 simply by interchanging the positions of rectangles $b_1$ and $b_2$. Again that part of the structure to the right of center is designated the different potential or DP-half since all oppositely disposed points therein differ in potential by the voltage E, while that part of the structure to the left of center is designated the equipotential or EP-half since all oppositely disposed points therein are at the same potential. For reasons which are apparent following the foregoing analysis of Fig. 1 the capacity $C_{13}$, between stationary electrode 1 and movable electrode 3, and the capacity $C_{23}$, between stationary electrode 2 and movable electrode 3, remain constant with deflection of electrode 3 so that the conditions of Equation 1 are met. Also, the capacity $C_{12}$ between the two stationary electrodes substantially doubles as the electrode 3 moves from a position wholly within the DP half to a position wholly within the EP half so that the condition of Equation 2 is fulfilled. The conditions of Equation 3 may be satisfied by appropriate shielding of electrode 3 with respect to ground as will be shown later.

Figure 1A:
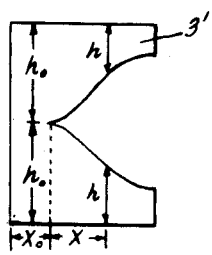
Fig. 1a shows a modification of Fig. 1.

When the electrodes are in the form shown in Figs. 1 and 2 the indication of an instrument so constructed will be essentially quadratic, or, in other words, the deflection of the movable electrode will be proportional to $E^2$. If it is desired that the character of the scale be linear in a more or less extended range, or should otherwise deviate from the quadratic, the desired characteristic may be obtained by changing the outline of electrode 3 from the rectangular form it has in in Figs. 1 and 2. In this respect it is a fundamental condition that the areas of the moving electrode above and below the center line in the direction of motion be symmetrical. A suitable outline of electrode 3 for use in either Fig. 1 or Fig. 2 to produce a linear characteristic is shown in Fig. 1a. If the outline of the moving electrode is described by its height $h$ perpendicular to the direction of motion as a function of $x$ measured along an axis in the direction of motion, $h(x)$ above and below the center line in the $x$ direction must decrease from the point $x_0$ in substantialy the manner shown in Fig. 1a.

It is possible to provide a linear or other nonquadratic characteristic by leaving the movable electrode 3 in its rectangular form and suitably modifying the outlines of the various rectangles making up the stationary electrodes in Figs. 1 and 2. Fig. 2a shows the stationary electrodes of Fig. 2 modified for this purpose. The modified rectangles $a'_1$, $b'_1$, $c'_1$, etc. correspond to the rectangles $a_1$, $b_1$, $c_1$, etc. of Fig. 2. As in Fig. 2, the internal boundaries of the rectangles are defined by broken lines in Fig. 2a. To produce a linear characteristic each of the rectangles making up the stationary electrodes should have an outline substantially as shown in Fig. 2b, the relationship between $h$ and $x$ being the same as in Fig. 1a.

When the stationary electrodes are modified as in Fig. 2a the capacity $C_{33}$ between electrode 3, not shown in Fig. 2a, and ground may no longer be independent of the position of electrode 3 because of the openings in the stationary electrodes. This may be remedied by shielding the movable electrode from ground. Suitable shielding for this purpose is shown in Fig. 2a in which each of the rectangles $a'_1$, $b'_1$, etc. has associated therewith an oppositely disposed solid shielding rectangle at the same potential. These shielding rectangles are designated 5–12 in the drawing. The distance between the shields and the stationary electrodes should be large relative to the distance between the movable electrode 3 and the stationary electrodes. Fig. 2a also shows shields closing the top and bottom of the space between the stationary electrodes in which the electrode 3 moves for further shielding this electrode from ground as mentioned earlier in the specification.

Figure 3A:
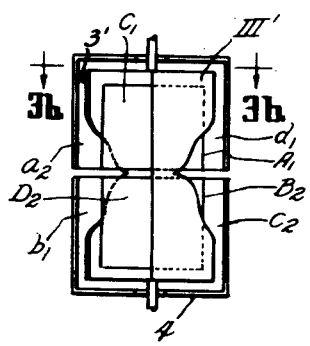
Figure 3B:
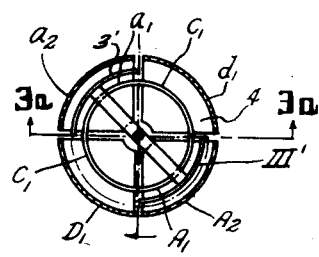

An electrostatic instrument having an electrode structure like that of Fig. 2 but in which the electrode surfaces are cylindrical is shown in elevation and plan views in Figs. 3a and 3b and in an exploded perspective view in Fig. 3c. As will be most clearly seen in Fig. 3c the electrode structure consists of two complete systems like that of Fig. 2 operating in parallel. The various rectangles making up the electrode surfaces have reference numerals corresponding to those used in Fig. 2. In order to impart a linear characteristic to the device the movable electrodes 3' and III' are given the outline shown in Fig. 1a. These electrodes are shown in their position of zero deflection. The mechanical connection between electrodes 3' and III' is shown in Fig. 3b but is omitted in Fig. 3c for the sake of clarity. End plates, such as shown at 4 in Figs. 3a and 3b, are used to close the ends of the structure for the purpose of shielding electrodes 3' and III' from ground. These also are omitted in Fig. 3c to provide a better view of the electrode structure.

Figure 4A:
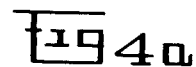
Figs. 4a, 4b and 4c show a practical embodiment of the invention using plane electrodes perpendicular to the axis of rotation.
Figure 4B:
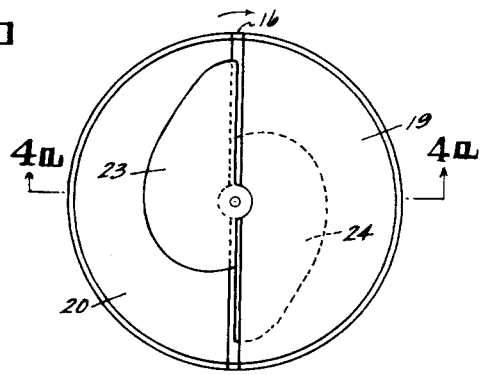

If it is desired to apply the basic idea of the invention to arrangements with electrode faces perpendicular to the axis this may be done in the way shown schematically in Figs. 4a and 4b. In this case the stationary electrodes consist of the two disc shaped lid electrodes 15 and 16 of different potential which may be supplied with shielding brims 17 and 18. The electrodes 15 and 16 may each be in the form of two connected half-discs for easier mounting if desired. Between electrodes 15 and 16 two half-discs 19 and 20 are inserted. Half-disc 19 is connected to electrode 15 and half-disc 20 to electrode 16. These half-discs may also be furnished with shielding brims 21 and 22 of the same breadth as the ones on lids 15 and 16, but which extend on both sides symmetrically to the half-disc plane, so that the two half-discs together with the two lids 15 and 16 form two symmetrical, flat, box-shaped spaces. The insulatedly suspended turning system in this case consists of two wings 23 and 24, rigidly and conductively connected together, which are polar-symmetrical to the turning axis and which are axially displaced so that one is situated in the center plane of the upper box-space and the other in the center plane of the lower box-space. Each of the two wings covers a maximum angular range of 180°. The radial outline of the wings can be shaped so that from a certain minimum deflection onward there results a linear or otherwise nonquadratic scale. For a scale substantially linear over most of its range the outlines of the wings take the form shown in Fig. 4b. The application of a voltage to be measured, E, between the two systems of interconnected electrodes results in a deflection of the movable elements 23 and 24 in the direction of the arrow.

Figure 4C:
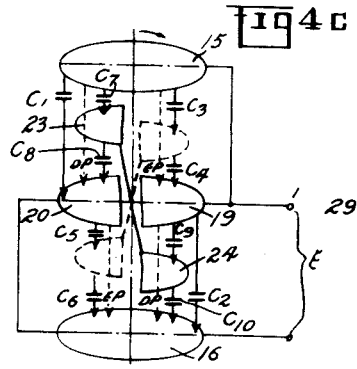

The above described arrangement is similar in operation to the arrangements of Figs. 1 and 2 and satisfies the conditions of Equations 1 and 2. The schematic diagram of the electrode structure in Fig. 4c shows more clearly the relationships between the various capacities of the electrode structure. As in Figs. 1 and 2 the structure has a different potential or DP-half and an equipotential or EP-half. The DP-half is that space situated between the left half of disc 15 and element 20 and between the right half of disc 16 and element 19. The EP-half is that space situated between the right half of disc 15 and element 19 and the left half of disc 16 and element 20. Also, as in Figs. 1 and 2, stationary electrode 1 is defined as the electrode structure connected to terminal 1 and is composed of elements 15 and 19, while stationary electrode 2 is defined as the electrode structure connected to terminal 2 and is composed of elements 16 and 20. The movable electrode 23—24 is in its position of zero deflection when wholly within the DP-half of the system, as shown in solid lines in Fig. 4c, and is in its position of maximum deflection when wholly within the EP-half of the system as shown in dotted lines.

In the position of zero deflection, the capacity between stationary electrode 1 and movable electrode 23, 24 is (4) $$C_{1m}=c_7+c_9$$

while for the position of maximum deflection this capacity is (5) $$C_{1m}=c_3+c_4$$

Since $c_3=c_4=c_7=c_9$, the capacity $C_{1m}$ does not change with deflection of the movable electrode 23—24. Similarly, $C_{2m}$ is likewise independent of the position of electrode 23—24. This electrode structure therefore satisfies Equation 1.

Equation 2 requires that the capacity $C_{12}$ between stationary electrodes 1 and 2 vary as some function of the deflection electrode 23—24. As in Figs. 1 and 2 the capacity $C_{12}$ in the electrode structure of Fig. 4c increases as the electrode 23—24 moves from its position of zero deflection to its position of maximum deflection. This will be apparent from a consideration of Fig. 4c. For the position of zero deflection, shown in the figure, (6) $$C_{12}=C_1+C_2$$

For the position of maximum deflection, shown in dotted lines in Fig. 4c, (7) $$C_{12}=C'_1+C'_2+\frac{(c_2+c_4)(c_5+c_6)}{c_3+c_4+c_5+c_6}$$

in which $C'_1$ and $C'_2$ are the values of $C_1$ and $C_2$ for the position of maximum deflection of electrodes 23—24. Since electrodes 23 and 24 are thin compared to the spacing of electrodes 15—20 and 16—19, the capacities $C'_1$ and $C'_2$ are only slightly smaller than corresponding capacities $C_1$ and $C_2$ and for practical purposes may be considered approximately equal thereto. Letting $C'_1=C_1$, $C'_2=C_2$, and $c=c_3=c_4=c_5=c_6$, Equation 7 becomes (8) $$C_{12}=C_1+C_2+c$$

The capacity $C_{12}$ therefore is increased by the amount $c$ as electrode 23—24 moves from its position of zero deflection to its position of maximum deflection.

The conditions of Equation 3 are met in this embodiment of the invention by the use of shielding brims 17, 18, 21 and 22 as seen in Fig. 4a.

A main advantage of the last described arrangement is that it can be made multicellular readily by superimposing several of the described systems so that they are both mechanically and electrically in parallel. Figs. 5 and 6 show schematically two ways of doing this. In the arrangement of Fig. 5 three systems of the type shown in Fig. 4a are operated in parallel with their rotating elements on a common shaft. The electrode structure is like that shown in Fig. 4a except that in Fig. 5 the elements 15 and 16 are made of two half-discs connected together so that they are at the same potential. The various elements of Fig. 5 bear the same reference numeral as the corresponding elements of Fig. 4a. It will be noted, however, that certain elements serve the function of both element 15 and element 16 and these elements accordingly bear both numerals.

Associated pairs of movable electrodes 23—24 must be conductively connected together; however, they may be conductively connected to or insulated from the remaining pairs whichever is desired.

The operation of Fig. 5 is identical with that of Fig. 4a except that three times the torque is produced for the same applied voltage. A meter constructed in accordance with Fig. 5 may be made to operate over two ranges by the use of switches as shown. In the low range position, which is the one shown, all electrodes are connected to terminals 1—2 for the production of maximum torque. For the high range only the lower set of electrodes are connected and the remaining electrodes are short circuited.

Fig. 6 shows another method of paralleling the electrode system of Fig. 4a. In this method adjacent systems are rotated 180° relative to each other as will be apparent from an inspection of Fig. 6. In this system electrodes 19 and 20 alternate on each side and therefore may be connected together and to the same terminal which offers some advantage from a wiring standpoint. A range switch may be applied to Fig. 6 in the same way as in Fig. 5.

Figure 7A:
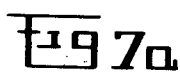
Figure 7B:
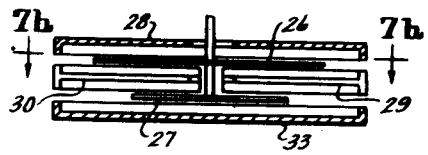
Figure 7B:
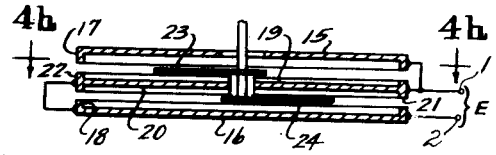
Figure 7B:
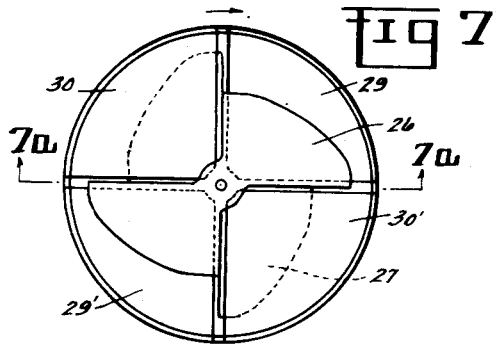
Figure 7C:
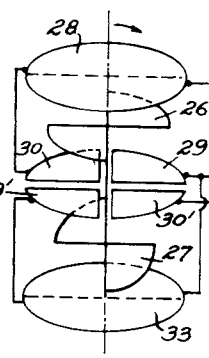

The above described arrangements with electrode faces perpendicular to the axis of rotation have a maximum range of deflection of 180° with the whole system covering 360°. If such a system is compressed to 180°, two such compressed systems may be combined to form a complete system occupying 360° with a maximum deflection of 90°. The individual stationary electrodes in this case are in the form of quadrants rather than half-discs. An arrangement of this kind is shown in Figs. 7a and 7b and schematically in Fig. 7c. Fig. 7c also shows the connections between the various elements of the stationary electrode structure. The movable element 26 is electrically connected to movable element 27.

The operation of this embodiment is similar to the operation of Figs. 4a–b–c. As in the other figures, the stationary electrode structure has a DP-half, composed of the space between elements 28—29, 28—29', 33—30 and 33—30', and an EP-half composed of the space between elements 28—30, 28—30', 33—29 and 33—29'. In the position of zero deflection, shown in Figs. 7a–b–c, the movable electrode 26—27 is entirely within the DP-half. At maximum deflection the electrode 26—27 is entirely within the EP-half of the electrode structure. The angular difference between zero and maximum deflection is 90°. For reasons analogous to those given in connection with Fig. 4c the capacity between the movable electrode 26—27 and the stationary electrodes connected to terminal 1, and the capacity between electrode 26—27 and the stationary electrode connected to terminal 2 are independent of the position of the movable electrode, whereas, the capacity between terminals 1 and 2 increases as electrode 26—27 moves from the position of zero deflection to the position of maximum deflection.

I claim:

1. An electrostatic instrument comprising a thin electrically insulated movable electrode and a pair of stationary electrodes, means for applying a voltage between said stationary electrodes, each of said stationary electrodes being composed of a plurality of conductively connected elements having commensurate faces, the faces of the elements composing each stationary electrode being equal in number to and being commensurate with the faces of the elements of the other stationary electrode, said thin movable electrode having an area not greater than one-half the face area of a stationary electrode, means positioning said elements with their faces in oppositely disposed relationship in a plurality of parallel surfaces with an equal even number of faces in each surface, means positioning said movable electrode midway between the surfaces having oppositely disposed faces therein, said positioning means also permitting displacement of said movable electrode from a position of zero displacement in which said movable electrode is wholly between one-half of said oppositely disposed faces to a position of maximum displacement in which said movable electrode is wholly between the other half of said oppositely disposed faces, the conductive connections between said elements being such that the oppositely disposed faces comprising said one-half are at different potential and the oppositely disposed faces comprising said other half are at the same potential, but with one-half of the equipotential oppositely disposed faces comprising said other half of opposite polarity with respect to the remaining half of the equipotential oppositely disposed faces comprising said other half.

2. An electrostatic instrument comprising an electrically insulated movable electrode and a pair of stationary electrodes; means for applying a voltage between said stationary electrodes; each of said stationary electrodes being composed of four conductively connected elements having rectangular faces commensurate to each other and to the faces of the elements in the other stationary electrode; means positioning the elements composing said stationary electrodes so that the rectangular faces of four of said elements are located in one surface and the rectangular faces of the remaining four of said elements are located in a second surface parallel to said one surface; the four rectangular faces in each surface being positioned in closely spaced relationship, with one of said faces located in each of the four quadrants defined by vertical and horizontal center lines in the surface, the four faces in each surface and the said vertical and horizontal center lines therein being the projections on that surface of the four faces and the vertical and horizontal center lines of the other surface, so that four pairs of oppositely disposed faces are provided; means positioning said movable electrode midway between said surfaces and permitting movement thereof from a position of zero displacement wholly within the space between the two pairs of oppositely disposed faces on one side of said vertical center lines to a position of maximum deflection wholly within the space between the two pairs of oppositely disposed faces on the other side of said vertical center lines; the conductive connections between said elements being such that the oppositely disposed faces on the said one side of said vertical center lines are at different potentials and the oppositely disposed faces on the said other side of said vertical center lines are at the same potential, but with the oppositely disposed faces above said horizontal center lines on said other side of said vertical center lines of opposite polarity to the oppositely disposed faces below said horizontal center lines.

3. Apparatus as claimed in claim 2 in which said faces and said surfaces are planar.

4. Apparatus as claimed in claim 2 in which said faces and said surfaces are cylindrical and concentric.

5. An electrostatic instrument comprising a plurality of electrode structures as claimed in claim 2 in which all of the faces and surfaces are cylindrical and concentric about an axis of symmetry, in which each electrode structure has an equal angular extent about said axis of symmetry, in which the corresponding faces in the various electrode structures have polar symmetry with respect to said axis and in which the movable electrodes of the said various electrode structures are mechanically joined and have polar symmetry with respect to said axis.

6. Apparatus as claimed in claim 2 in which the elemental area of said movable electrode varies as a function of its dimension in the direction of its motion and symmetrically with respect to said horizontal center lines for the purpose of making the deflection of said movable electrode substantially a linear function of said applied voltage.

7. Apparatus as claimed in claim 2 in which the edges of said faces nearest said horizontal center lines recede from said horizontal center lines by an amount that increases in the direction of increasing deflection of said movable electrode.

8. An electrostatic instrument comprising an electrically insulated movable electrode and a pair of stationary electrodes; means for applying a voltage between said stationary electrodes; each of said stationary electrodes being composed of three conductively connected elements in the form of half-discs identical in dimensions to each other and to the elements in the other stationary electrode; means positioning two of said half-discs in each of first, second and third planes perpendicular to an axis of symmetry, said half-discs being concentric to said axis of symmetry and having their straight edges substantially in a common plane passing through said axis of symmetry; said movable electrode having an axis of rotation and two planar wings perpendicular to said axis of rotation and spaced therealong, said wings having 180° polar symmetry with respect to said axis of rotation; means positioning said movable electrode with its axis of rotation in coincidence with said axis of symmetry and with one wing midway between said first and second planes and the other wing midway between said second and third planes; said positioning means also providing for movement of said movable electrode from a position of zero deflection, in which said wings are located wholly between a first set of half-discs consisting of half-discs in said first and second planes on one side of said common plane and half-discs in said second and third planes on the other side of said common plane, and a position of maximum deflection, in which said wings are located between a second set of half-discs consisting of half-discs in said first and second planes on said other side of said common plane and half-discs in said second and third planes on said one side of said common plane; said conductive connections between said elements being such that oppositely disposed half-discs in said first set are at different potentials and oppositely disposed half-discs in said second set are at the same potential, with the oppositely disposed half-discs of said second set located in said first and second planes at opposite polarity with respect to the oppositely disposed half-discs of said second set located in said second and third planes.

9. Apparatus as claimed in claim 8 in which the outline of the wings of said movable electrode is such that the capacity between the two stationary electrodes varies linearly with respect to the angle of rotation of the movable electrode.

10. In an electrostatic instrument, a stationary electrode structure comprising first and second metallic discs and two half-discs, all of equal radii, means positioning said discs in parallel spaced relation at right angles to and concentric with an axis of symmetry; means positioning said half-discs in a plane perpendicular to said axis of symmetry and midway between said discs, said half-discs being concentric to said axis of symmetry; an electrically insulated movable electrode having an axis of rotation and two planar wings perpendicular to said axis of rotation and spaced therealong, said wings having 180° polar symmetry with respect to said axis of rotation; means positioning said movable electrode with its axis of rotation in coincidence with said axis of symmetry and with one wing midway between said first disc and said half-discs and the other wing midway between said second disc and said half-discs; said positioning means also providing for movement of said movable electrode from a position of zero deflection in which one wing of said movable electrode is wholly between said first disc and one of said half-discs and the other wing is wholly between said second disc and the other of said half-discs, and a position of maximum deflection, in which said one wing is wholly between said first disc and said other half-disc and said other wing is wholly between said second disc and said one half-disc; means conductively connecting said one-half disc to said second disc and said other half-disc to said first disc; and means for applying a voltage between said first and second discs.

11. Apparatus as claimed in claim 10 in which the outline of the wings of said movable electrode is such as to produce a substantially linear relation between the angle of rotation of said movable electrode and the capacity between said first and second discs.

12. In an electrostatic instrument, a stationary electrode structure comprising first and second metallic discs and four metallic quarter-discs all of equal radii; means positioning said discs in parallel spaced relation at right angles to and concentric with an axis of symmetry; means positioning said quarter-discs in a plane perpendicular to said axis of symmetry and midway between said discs, said quarter-discs being concentric to said axis of symmetry, an electrically insulated movable electrode having an axis of rotation and two pairs of planar wings perpendicular to said axis of rotation and spaced therealong, the wings in each of said pairs having 180° polar symmetry with respect to said axis of rotation, and said pairs of wings occupying angular positions on said axis of rotation that are 90° apart; means positioning said movable electrode with its axis of rotation in coincidence with said axis of symmetry and with one pair of wings midway between said first disc and said quarter-discs and the other pair of wings midway between said second discs and said quarter-discs; said positioning means also providing for movement of said movable electrode from a position of zero deflection, in which one pair of wings of said movable electrode are wholly between one pair of diagonally opposite quarter-discs and said first discs and the other pair of wings are wholly between the other pair of diagonally opposite quarter-discs and said second disc, to a position of maximum deflection, in which said one pair of wings are wholly between said other pair of diagonally opposite quarter-discs and said first disc and said other pair of wings are wholly between said one pair of diagonally opposite quarter-discs and said second disc; means conductively connecting said one pair of diagonally opposite quarter-discs to said second disc and said other pair of diagonally opposite quarter-discs to said first disc; and means for applying a voltage between said first and second discs.

13. Apparatus as claimed in claim 12 in which the outline of said wings is such as to produce a substantially linear relation between the angle of rotation of said movable electrode and the capacity between said first and second discs.

14. An electrostatic instrument comprising a pair of stationary electrodes, means for applying a voltage between said stationary electrodes, each of said stationary electrodes being composed of a plurality of conductively connected elements having commensurate faces, the faces of the elements composing each stationary electrode being equal in number to and being commensurate with the faces of the elements of the other stationary electrode, means positioning said elements with their faces in oppositely disposed relationship in a plurality of parallel surfaces with an equal even number of faces in each surface, the disposition of said faces in said surfaces being such that one-half of said oppositely disposed faces are at different potential whereas the other half of said oppositely disposed faces are at the same potential, with half of the equipotential oppositely disposed faces comprising said other half of opposite polarity with respect to the remaining half of the equipotential oppositely disposed faces comprising said other half, a thin electrically insulated movable electrode of such size as to be entirely includable between the oppositely disposed different potential faces and likewise also between the oppositely disposed equipotential faces, means positioning said movable electrode midway between the said surfaces and permitting displacement of said movable electrode from a position of zero displacement in which said movable electrode is wholly between said oppositely disposed different potential faces to a position of maximum displacement in which said movable electrode is wholly between said oppositely disposed equipotential faces.

References Cited in the file of this patent

UNITED STATES PATENTS

| Number | Name | Date |
|---|---|---|
| 771,968 | Bowman | Oct. 11, 1904 |
| 2,032,932 | Hauffe | Mar. 3, 1936 |
| 2,423,100 | Handley | July 1, 1947 |

FOREIGN PATENTS

| Number | Country | Date |
|---|---|---|
| 154,298 | Germany | Sept. 13, 1904 |
| 244,371 | Germany | Mar. 7, 1912 |
| 168,775 | Switzerland | Aug. 1, 1934 |
| 668,661 | Germany | Dec. 8, 1938 |